United States Patent [19]

Cohen

[11] Patent Number: 5,020,018
[45] Date of Patent: May 28, 1991

[54] OUTER PRODUCT OPTICAL INTERFEROMETER WITH HOLOGRAM

[75] Inventor: Jonathan D. Cohen, Hanover, Md.

[73] Assignee: The United States of America as represented by the Director of National Security Agency, Washington, D.C.

[21] Appl. No.: 318,031

[22] Filed: Mar. 1, 1989

[51] Int. Cl.⁵ .......................... G06E 3/00; G06E 7/19
[52] U.S. Cl. ................................... 364/837; 364/822; 364/827; 364/845
[58] Field of Search .............. 364/822, 837, 827, 841, 364/845; 356/345, 347, 348, 353, 354, 356, 359, 360; 350/162.11, 162.24, 162.12

[56] References Cited

U.S. PATENT DOCUMENTS

| | | | |
|---|---|---|---|
| 3,509,565 | 4/1970 | Miwilmotte | 350/162.14 |
| 3,602,593 | 8/1971 | Krulikuski, Jr. | 350/162.14 |
| 3,903,407 | 9/1975 | Burnham | 364/822 |
| 4,071,907 | 1/1978 | Casasent | 364/822 |
| 4,082,431 | 4/1978 | Ward, III | 364/827 |
| 4,089,589 | 5/1978 | Brockman et al. | 364/822 |
| 4,118,124 | 10/1978 | Matsuda | 356/353 |
| 4,265,534 | 5/1981 | Remijan | 356/354 |
| 4,310,894 | 1/1982 | Lee et al. | 364/822 |
| 4,556,950 | 12/1985 | Tai et al. | 364/827 |
| 4,588,260 | 5/1986 | Horner | 364/822 |
| 4,690,552 | 9/1987 | Grant et al. | 356/353 |
| 4,707,137 | 11/1987 | Lee | 356/353 |
| 4,711,576 | 12/1987 | Ban | 356/353 |
| 4,758,089 | 7/1988 | Yokokura et al. | 356/348 |
| 4,758,976 | 7/1988 | Cohen | 364/837 |
| 4,838,644 | 6/1989 | Ochon et al. | 364/822 |
| 4,892,370 | 1/1990 | Lee | 350/162.12 |

OTHER PUBLICATIONS

Sov. J. Opt Technol 48, 8 Aug. 81, pp. 49–51.

*Primary Examiner*—Jerry Smith
*Assistant Examiner*—Jim Trammell
*Attorney, Agent, or Firm*—John R. Utermohle; Thomas O. Maser

[57] ABSTRACT

An outer product shearing interferometer for an optical source of one-dimensional extent which provides interference between every two points on the source. The interferometer comprises an input plane containing the source, an output plane for observing the outer product, a hologram which imparts the sum of two contributions whose phases are bilinear functions of the spatial coordinates, a two-dimensional Fourier transform system which illuminates the hologram with the transform of light from the input plane, and a one-dimensional Fourier transform system which takes light from the hologram and illuminates the output plane.

2 Claims, 2 Drawing Sheets

OUTER PRODUCT OPTICAL INTERFEROMETER WITH HOLOGRAM

BACKGROUND OF THE INVENTION

Interferometers which superimpose two versions of the same optical wavefront are known as shearing interferometers. Using a shearing interferometer one may measure the relative phase between different points on the same wavefront. Shearing interferometers have been employed for component testing, astronomical observation, turbulence studies, coherence measurement, and optical signal processing. They are classed as lateral, radial, reversing, or rotational, depending on whether the resulting wavefront versions are related to each other by translation, dilation, reflection about a line, or rotation, respectively.

The problem addressed by my invention is to operate on an object which is one-dimensional and to provide simultaneous interference between every pair of points on the object. Specifically, suppose that the object has scalar field amplitude $$a(x,y,t) = a(x,t)\delta(y),$$

where $\delta$ is the Dirac delta function and $a(x,t)$ is some function to be examined. The problem is to produce a plane in which the optical intensity has a term proportional either to $$I_1(x,y,t) = Re\{a(x,t-d)a^*(y,t-d)\}$$

or to $$I_2(x,y,t) = Re\{a(x,t-d)a^*(x+y,t-d)\},$$

depending upon which format is more convenient for the application, and where d is some delay. (For the remainder of this disclosure, the understood time dependence will be suppressed.)

Viewing $a$ as a vector indexed by x, the result $I_1$ may be regarded as (the real part of) the outer product of $a$ with itself, that is, $I_1$ is a matrix whose entries are all the possible products of one element of $a$ with another element of $a$. The result $I_2$ contains the same information in a different format. The former description provides coordinates which explicitly index the two factors, while the latter format gives one coordinate which is the difference between the indices of $a$.

BRIEF DESCRIPTION OF THE PRIOR ART

To effect the outer product described hereinabove using a lateral shearing interferometer requires that many lateral shears be applied simultaneously; however, lateral shearing interferometers found in the prior art apply only one shear at a time. Such interferometers are typified by U.S. Pat. No. 4,711,576 to Ban and U.S. Pat. No. 4,707,137 to Lee.

Conceptually, the first step in achieving the desired outer product might be a system which makes the input uniform in one direction while retaining the variation in x. This is effected by the Fourier transform with respect to y, producing $$\tilde{a}_y(x,\zeta) = \int_{\infty}^{\infty} a(x,y) e^{-j2\pi y\zeta} dy$$
$$= a(x).$$

By applying a rotational or reversing interferometer to this one-dimensional transform, an interference term bearing the desired outer product may be obtained. For example, a rotational shearing interferometer which shears 90° could produce an intensity $$|\tilde{a}_y(x,\zeta) + \tilde{a}_y(\zeta,-x)|^2 = |a(x) + a(\zeta)|^2$$
$$= |a(x)|^2 + |a(\zeta)|^2 + 2Re\{a(x) a^*(\zeta)\}.$$

The latter (interference) term bears the required product. Similarly, a reversing shearing interferometer which reflects about the diagonal can produce $$|\tilde{a}_y(x,\zeta)+\tilde{a}_y(\zeta,x)|^2 = |a(x)|^2+|a(\zeta)|^2+2Re\{a(x-)a^*(\zeta)\}.$$

Rotational interferometers in the prior art employ a pair of Dove prisms—an arrangement which is not common path, is expensive, and is difficult to stabilize. Such apparatus is described by Matveev et al., *Soviet Journal of Optical Technology*, Vol. 48, Aug. 1981, pp. 449–451. A reversing interferometer proposed by Mertz and described in U.S. Pat. No. 4,758,976 to Cohen, consisting of a Michelson interferometer having a roof prism in one leg and an ordinary mirror in the other, can be fashioned as a block, but with extreme difficulty of fabrication and expense. An alternative reversing interferometer described by U.S. Pat. No. 4,556,950 to Tai et al. consists of multiple gratings and is a separate-path arrangement which is not mechanically stable. Tai et al. also produces its output on a grazing-incidence beam combiner, requiring difficult optics to recover the interference results.

SUMMARY OF THE INVENTION

Accordingly, it is an object of this invention to provide an optical interferometer which overcomes the limitations of the prior art.

It is a further object of this invention to provide an outer product interference between all points on an optical source of one-dimensional extent.

It is a still further object of this invention to provide an interferometer which is highly stable mechanically and thermally.

It is yet another object of this invention to provide an interferometer which is easily and inexpensively constructed.

An apparatus having these and other desirable features would include a light source located in an input plane having one-dimensional extent along an axis, means for detection located in an output plane, means for imaging light from said input plane to said output plane, and a mask located in the Fourier transform plane of said imaging means, said mask being opaque except for segments of two nonparallel lines, with neither of said lines being perpendicular to said axis of said light source.

BRIEF DESCRIPTION OF THE FIGURES

Other objects and advantages of my invention will become apparent from a study of the following specification when viewed in the light of the accompanying drawings, in which.

DETAILED DESCRIPTION OF THE PREFERRED EMBODIMENT

In the specification which follows, let $a_i(x_i,y_i)$ denote the scalar field amplitude arriving at plane i, let $a_i'(x_i,y_i)$ denote the scalar field amplitude leaving plane i, and let $\sim$ denote the Fourier transform.

Figure 1:
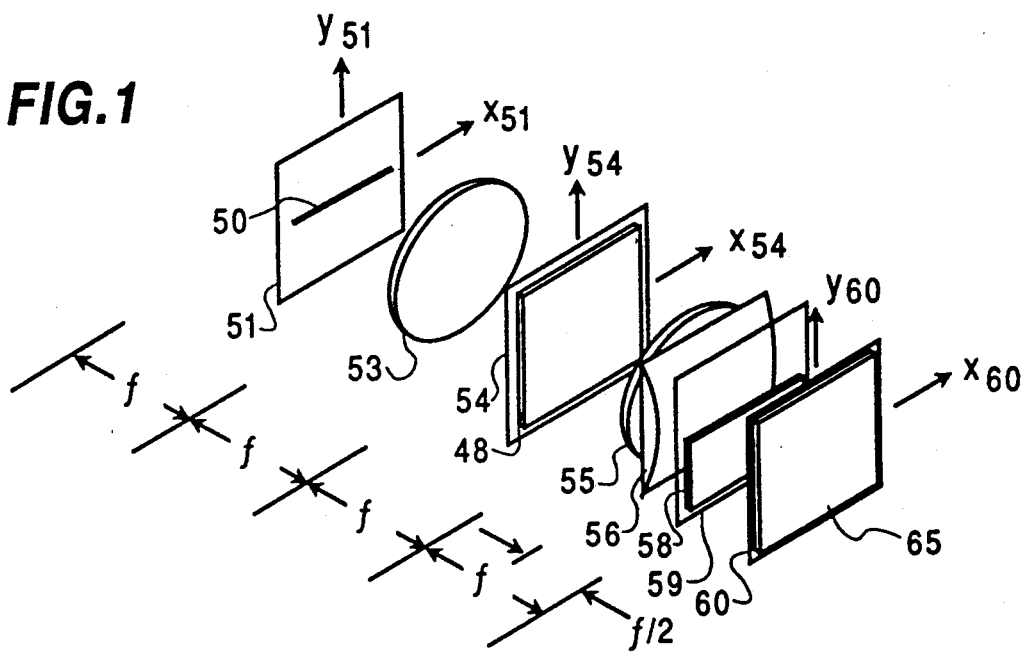
FIG. 1 is an optical schematic diagram of a preferred embodiment.

FIG. 1 shows the preferred embodiment of the interferometer. The one-dimensional source 50, located in input plane 51, and having wavelength λ, has its axis in the x direction and produces light of amplitude $$a'_{51}(x_{51},y_{51}) = a(x_{51})\delta(y_{51}).$$

Lenses 53, 55, and 56 have a focal length of f. Input plane 51 is in the front focal plane of lens 53, while hologram 48, in plane 54, is located in the back focal plane of lens 53. Because of the well-known Fourier transform property of lenses, the light's amplitude illuminating plane 54 is the two-dimensional Fourier transform of the amplitude leaving plane 51. Thus, $$a_{54}(x_{54},y_{54}) = \int\int a'_{51}(x_{51},y_{51})\, e^{[-j2\pi(x_{51}x_{54}+y_{51}y_{54})/\lambda f]} dx_{51}\, dy_{51}$$

$$= \int a(x_{51})\, e^{-j2\pi x_{51}x_{54}/\lambda f} dx_{51}.$$

Figure 2:
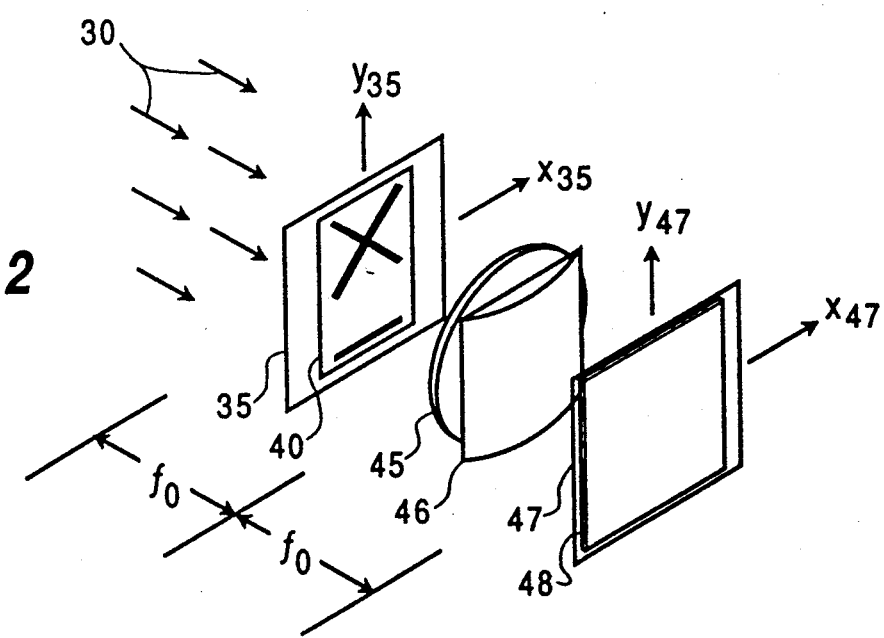
FIG. 2 is an optical schematic diagram showing apparatus for forming a hologram for use in the apparatus of FIG. 1.
Figure 3A:
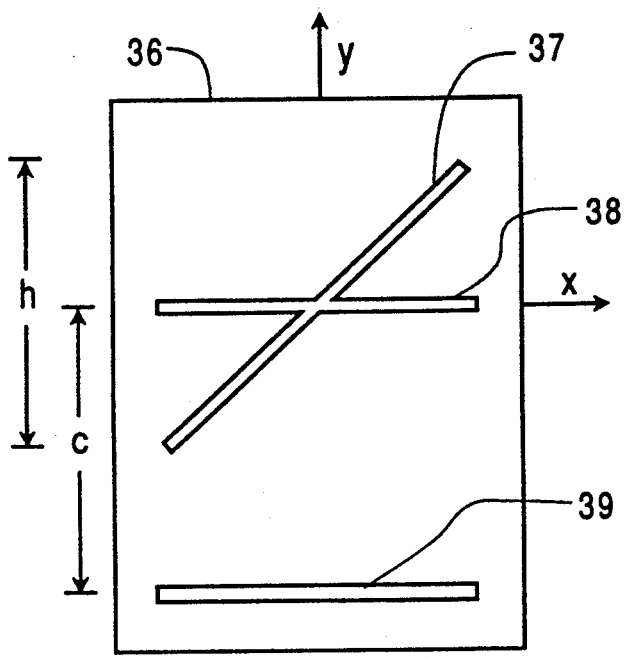
FIGS. 3a and 3b are diagrams of alternative masks employed in the apparatus of FIG. 2, showing the definitions of mathematical symbols.
Figure 3B:
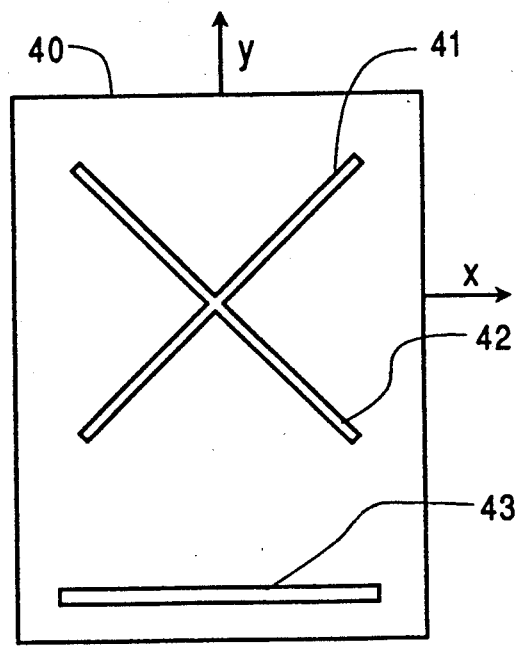

Hologram 48 may be formed by using the apparatus of FIG. 2. FIG. 2 shows the use of mask 40, although either mask 36 or 40, detailed in FIGS. 3a and 3b, may be used. Each of these masks is opaque except for three transparent slits. In mask 36, slit 39 serves as a reference slit for slits 37 and 38. In mask 40, slit 43 serves as a reference slit for slits 41 and 42. As apparent below, these reference slits will serve to produce a component of exposure on the hologram which is linear in the desired term and is on a spatial carrier separating it from other terms.

To form hologram 48 from mask 36 or 40, the respective mask is placed in plane 35 and illuminated by light 30 of wavelength $\lambda_0$. Light leaving plane 35 has amplitude $$a'_{35}(x_{35},y_{35}) = p(y_{35}+sx_{35})+p(y_{35}-x_{35})+p(y_{35}+c),$$

where p(x), the profile of the slits, is $$p(y) = \begin{cases} 1, & |y| \leq w/2 \\ 0 & \text{otherwise,} \end{cases}$$

and where s=0 or s=1, depending upon which mask is being used: the choice of s=0 corresponds to mask 36, while s=1 corresponds to mask 40. Spherical lens 45 and cylindrical lens 46, placed between plane 35 and the hologram 48, transform this light in the vertical (y) direction while imaging to the plane 47 of hologram 48 in the horizontal (x) direction. The resulting amplitude reaching the plane 47 is $$a_{47}(x_{47},y_{47}) = \int [p(y_{35}-sx_{47})+p(y_{35}+x_{47})+p(y_{47}+c)]\, e^{-j2\pi y_{35}y_{47}/\lambda_0 f_0}\, dy_{35}$$

$$= \tilde{p}\left(\frac{y_{47}}{\lambda_0 f_0}\right)[e^{-j2\pi sx_{47}y_{47}/\lambda_0 f_0} + e^{j2\pi x_{47}y_{47}/\lambda_0 f_0} + e^{j2\pi cy_{47}/\lambda_0 f_0}].$$

The hologram records the impinging intensity (the square modulus of $a_{47}$) for a period of time. Properly developed, the amplitude transmission of the finished hologram is proportional to this exposure. The hologram needs to be made only once and may then be used as a component in the desired interferometer.

The finished hologram is placed in the apparatus of FIG. 1 in plane 54. The hologram multiplies the passing light by its amplitude transmission. Between hologram 48 and output plane 60 are located lenses 55 and 56 and order stop 58. Lenses 55 and 56 serve to effect a Fourier transform in the horizontal (x) direction while imaging in the vertical (y) direction. The function of the order stop is explained below.

The hologram multiplies its illumination amplitude by an amount proportional to its exposure, $E(x_{54},y_{54}) = E_{-1}(x_{54},y_{54}) + E_0(x_{54},y_{54}) + E_1(x_{54},y_{54})$, where $$E_0(x_{54},y_{54}) = \left|\tilde{p}\left(\frac{y_{54}}{\lambda_0 f_0}\right)\right|^2 \left[3 + 2\cos\left(2\pi \frac{x_{54}y_{54}(1+s)}{\lambda_0 f_0}\right)\right],$$

$$E_1(x_{54},y_{54}) =$$

$$\left|\tilde{p}\left(\frac{y_{54}}{\lambda_0 f_0}\right)\right|^2 e^{-j2\pi cy_{54}/\lambda_0 f_0}[e^{-j2\pi sx_{54}y_{54}/\lambda_0 f_0} + e^{j2\pi x_{54}y_{54}/\lambda_0 f_0}],$$

and $$E_{-1}(x_{54},y_{54}) =$$

$$\left|\tilde{p}\left(\frac{y_{54}}{\lambda_0 f_0}\right)\right|^2 e^{j2\pi cy_{54}/\lambda_0 f_0}[e^{j2\pi sx_{54}y_{54}/\lambda_0 f_0} + e^{-j2\pi x_{54}y_{54}/\lambda_0 f_0}].$$

The three contributions above are centered about different vertical (y) spatial frequencies, so that the diffraction from the hologram is divided into three orders corresponding to these three terms, respectively. The reference slit offset c is chosen to be larger than 3/2 h+w so that these orders will have disjoint diffraction angles. There exists a filter plane 59 between lens 56 and output plane 60 where the vertical (y) transform of the hologram is seen. It is here that the orders will be spatially disjoint and here that order stop 58 is inserted to block the contributions from $E_0$ and $E_{-1}$. The function of the hologram, then, is to apply a modulation to the passing light which contains the sum of two contibutions whose phases are different bilinear functions of x and y.

With the contributions from $E_0$ and $E_{-1}$ suppressed, the light from plane 54 has amplitude $$a'_{54}(x_{54},y_{54})|_{1st\,order} = E_1(x_{54},y_{54}) \int a(x_{51}) e^{-j2\pi x_{51} x_{54}/\lambda f} dx_{51}.$$

Traveling from plane 54 to 60, there is a reversal in the vertical (y) axis and a transform in the horizontal (x) axis. As a result, $$a_{60}(x_{60},y_{60}) = \int a'_{54}(x_{54},-y_{54})|_{1st\,order} e^{-j2\pi x_{54} x_{60}/\lambda f} dx_{54}$$

$$= \lambda f \left| \tilde{p}\left(\frac{-y_{60}}{\lambda_0 f_0}\right) \right|^2 e^{j2\pi c y_{60}/\lambda_0 f_0} \left[ a\left(\frac{\lambda f}{\lambda_0 f_0} sy_{60} - x_{60}\right) + a\left(-\frac{\lambda f}{\lambda_0 f_0} y_{60} - x_{60}\right) \right].$$

Output plane 60 may contain any detection means 65 suitable for studying the outer product including, though not limited to, photographic film, an array of photodetectors, a vidicon, or the write face of a light-to-light modulator. In particular, this outer product interferometer is an appropriate shearing interferometer for the triple product processor disclosed by Cohen (U.S. Pat. No. 4,758,976) in which the preferred detector is an array of semiconductor photodetectors. The detection means 65 will see intensity.

$$|a_{60}(x_{60},y_{60})|^2 =$$

$$(\lambda f)^2 \left| \tilde{p}\left(\frac{-y_{60}}{\lambda_0 f_0}\right) \right|^4 \left[ \left| a\left(\frac{\lambda f}{\lambda_0 f_0} sy_{60} - x_{60}\right) \right|^2 + \right.$$

$$\left| a\left(-\frac{\lambda f}{\lambda_0 f_0} y_{60} - x_{60}\right) \right|^2 +$$

$$\left. 2Re\left\{ a\left(\frac{\lambda f}{\lambda_0 f_0} sy_{60} - x_{60}\right) a^*\left(-\frac{\lambda f}{\lambda_0 f_0} y_{60} - x_{60}\right) \right\} \right].$$

With the choices of s=1 and the axes $$x = \frac{\lambda f}{\lambda_0 f_0} y_{60} - x_{60} \text{ and } y = -\frac{\lambda f}{\lambda_0 f_0} y_{60} - x_{60},$$

one can see that this is the desired outer product result $I_1$ (except for the weighting factor in front). Alternatively, with the choices of s=0 and the axes $$x = -x_{60} \text{ and } y = -\frac{\lambda f}{\lambda_0 f_0} y_{60},$$

one can see that this is the desired outer product result $I_2$.

To avoid weighting of the output, $\tilde{p}$ must be uniform enough over the desired range of $y_{60}$. With the mask lines being slots of width w, $$\left| \lambda f \tilde{p}\left(\frac{y_{60}}{\lambda f}\right) \right|^2 = (\lambda f w)^2 \text{sinc}^2\left(\frac{w y_{60}}{\lambda f}\right),$$

where $$\text{sinc}(y) = \frac{\sin(\pi y)}{\pi y}.$$

Now suppose that the length of the source 50 is l. Then as long as $$w < \frac{\lambda f}{l},$$

the weighting function in front will be nearly constant for all values of $y_{60}$ of interest.

Since both "paths" of the interferometer are essentially coincident, the interferometer is extremely stable. Moreover, the fringes are not very sensitive to hologram alignment.

The source 50 in the embodiment need not be a primary source of light. Light in the input plane 51 may result from any process or apparatus suitable for the application. In particular, this outer product interferometer is an appropriate shearing interferometer for the triple product processor disclosed by Cohen (U.S. Pat. No. 4,758,976) in which the input plane exists in an acoustooptic device, and the light source is light leaving said acoustooptic device.

Other lens systems for imaging and transforming may be used to achieve embodiments with different scales, aberations, and other characteristics suitable for the intended application.

The arrangement and shape of slits in the masks may be modified to achieve different output scaling, output weighting, image point spread function, and other characteristics suitable for the intended application. In particular, the slits may meet at angles other than 90 or 45 degrees, resulting in anamorphic scale changes in the output plane. Phase-shifting modifications may be made to the slits to produce real and imaginary components of the outer product of a complex source. Note also that the hologram may be modified to incorporate some of the operations of the lenses.

Those skilled in the art will recognize that my invention may take many forms other than the embodiments described herein, and that I intend that my invention be limited only as set forth in the appended claims.

I claim:

1. An outer product interferometer, comprising:
    a light source located in an input plane having one-dimensional extent along an axis;
    means for effecting a two-dimensional Fourier transform of light leaving said input plane, said two-dimensional transform occurring in a transform plane, said transform plane possessing a first spatial dimension parallel to said axis of said light source and a second spatial dimension orthogonal to said first spatial dimension;
    means in said transform plane for modulating light from said two-dimensional Fourier transform, said modulation including the sum of two contributions whose complex phases are distinct bilinear functions of said first spatial dimension and said second spatial dimension; and
    means for effecting a one-dimensional Fourier transform of said modulated light in said first spatial dimension and an image of said modulated light in said second spatial dimension; and
    means in an output plane for detecting said one-dimensional Fourier transform and said image.

2. The apparatus of claim 1 wherein said modulation means is a hologram.

* * * * *